Feb. 15, 1966     J. G. McMAHON     3,234,637
METHOD AND APPARATUS FOR THE ASSEMBLY OF SLIDE FASTENERS
Filed Sept. 24, 1964     9 Sheets-Sheet 1

Feb. 15, 1966  J. G. McMAHON  3,234,637
METHOD AND APPARATUS FOR THE ASSEMBLY OF SLIDE FASTENERS
Filed Sept. 24, 1964  9 Sheets-Sheet 5

Feb. 15, 1966   J. G. McMAHON   3,234,637
METHOD AND APPARATUS FOR THE ASSEMBLY OF SLIDE FASTENERS
Filed Sept. 24, 1964   9 Sheets-Sheet 7

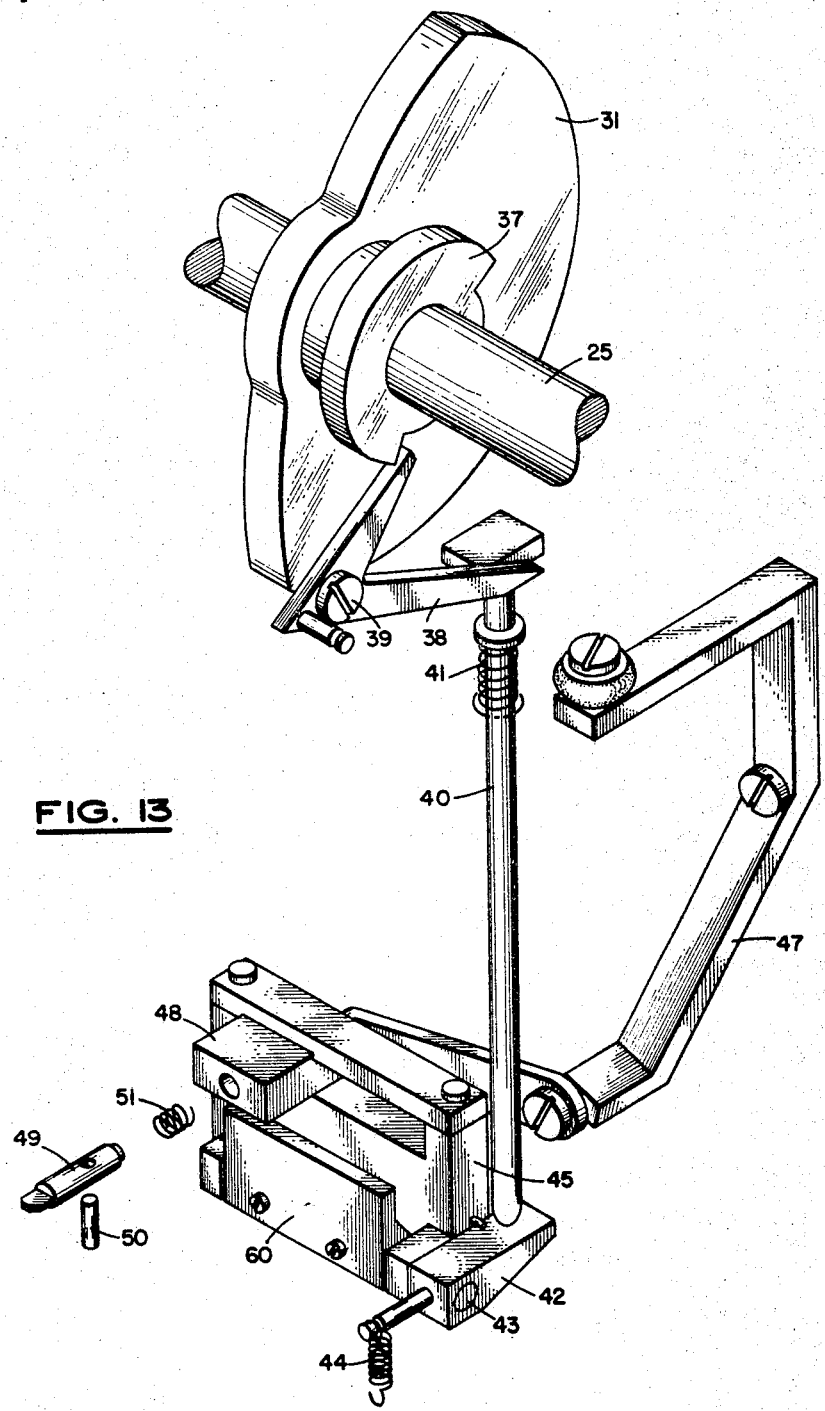

Feb. 15, 1966 J. G. McMAHON 3,234,637
METHOD AND APPARATUS FOR THE ASSEMBLY OF SLIDE FASTENERS
Filed Sept. 24, 1964 9 Sheets-Sheet 9

United States Patent Office 3,234,637
Patented Feb. 15, 1966

3,234,637
METHOD AND APPARATUS FOR THE
ASSEMBLY OF SLIDE FASTENERS
John G. McMahon, deceased, late of Brooklyn, N.Y., by Mary McMahon, administratrix, Brooklyn, N.Y., assignor to Slide-O-Matic Corporation, a corporation of New York
Filed Sept. 24, 1964, Ser. No. 399,113
9 Claims. (Cl. 29—408)

The present invention relates to a method and apparatus for assembling slide fasteners. More specifically, the instant invention relates to a method and apparatus for placing sliders on stringers or tapes containing teeth with intermittent gaps.

In recent years, the assembly of slide fasteners has become subject to automation. Previous manual assembly lines have been replaced by semi-automatic and automatic machines which greatly reduce the amount of labor required. Though the manual operation for the assembly of sliders on the slide fastener tape is comparatively simple, the machines thus far developed have been strikingly complicated.

Not only are these complicated mechanisms extremely expensive, requiring high initial capital outlays, but their many parts frequently break down, resulting in loss of operating time and costly maintenance.

The primary reason for the complexity of the mechanisms required was the difficulty in engaging the bead on the inner edge of the tape with the slider channels. To accomplish this result, the prior art resorted to back-and-forth movement of the tape or elaborate series of fingers for forcing the bead into the channel.

Another difficulty with the apparatus described in the prior art is the method of successively feeding and securing the sliders during the assembly operation. The slider is generally moved forward and held in position by means of the tab which is appended loosely therefrom. This resulted in inaccuracy in support and positioning of the slider in respect to the tape.

In accordance with the instant invention a method and machine has been developed which requires less moving parts and essentially flawless operation.

In a first embodiment of the invention a mechanism is provided which needs only move the tape in one direction and employs a simplified series of parts for assembly.

A second embodiment of the invention teaches a method of moving and transporting the slider which is completely independent of the tab and which provides accurate and secure positioning of the slider in respect to the tape.

To illustrate further the instant invention, attention is directed to the attached figures.

FIGURE 13 is a fractional isometric view of the slider feed assembly.

Figure 14A:
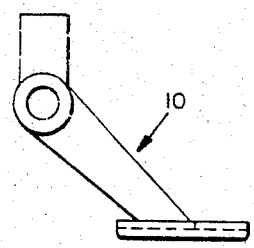
Figure 14B:
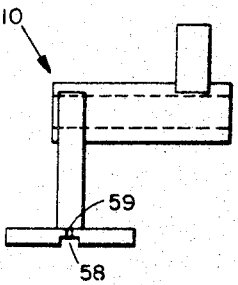
Figure 14C:
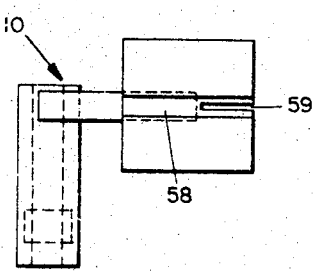

FIGURES 14a, b and c are front, top and side views, respectively, of the pressure pad.

Figure 15A:
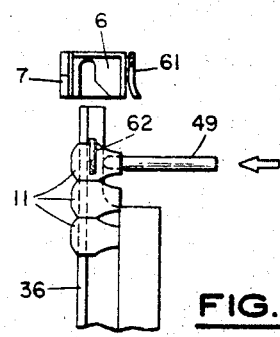

FIGURES 15a, b, c and d are top views showing the relationship of the finger and nest assembly at various phases of the cycle.

Turning first to FIGURES 1 through 7, the position of the important elements of the machine during the various steps of the mechanical cycle are shown. The tape 1 moves to the right along support table 2 until the tapped space 3 overlies the feeler 4. The tape 1 has teeth or elements 8 before and after the gap space 3. The inner edges of the tape have a bead 9, discussed hereafter. The feeler 4, connected to a solenoid, rises in the gap 3, discontinues power to the mechanical clutch which transports the tape 1 across the support 2, and commences the mechanical cycle. Due to a predetermined lag in the mechanical clutch's response to the solenoid, the tape advances a fixed amount, so that the gap is positioned as illustrated in FIGURES 1a and 1b. At this point in the mechanical cycle the gripper 5 and the nest and plunger assembly 6 and 7 are positioned out of contact with the tape 3. A pressure pad 10, shown only in FIGURE 1a, has a slot for guiding the tape 1 over the support 2.

In the second phase of the mechanical cycle the grippers 5 descend, press firmly against the tape 1, and spread the gap 3 in the third phase of the cycle. The nest assembly 6, which supports the slider 11, raises, thereby bringing the slider 11 into the path of the tape 1. The plunger 7, integrally united to the nest 6, precedes the slider into position and widens the gap space 3 in front of the slider 11, thereby facilitating the slider positioning. This phase of the cycle is diagrammatically shown in FIGURES 3a and 3b.

Figure 1A:
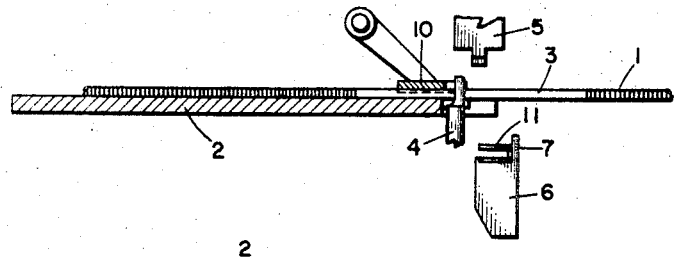
FIGURES 1a and 1b are diagrammatic side and top views of the important elements of the machine at the beginning of the mechanical cycle.
Figure 1B:
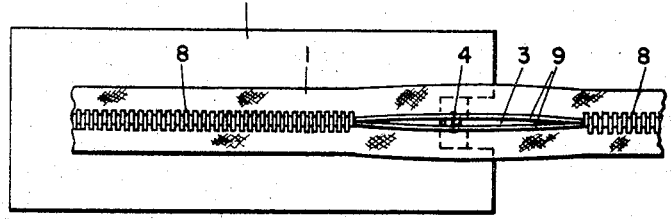
Figure 2A:
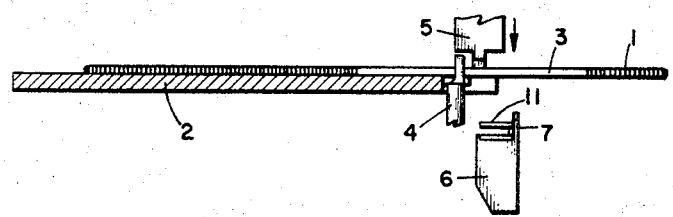
FIGURES 2a and 2b are side and top views illustrating the initial spreading of the tape prior to positioning of the slider.
Figure 2B:
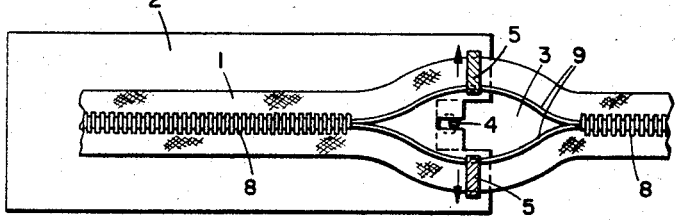
Figure 3A:
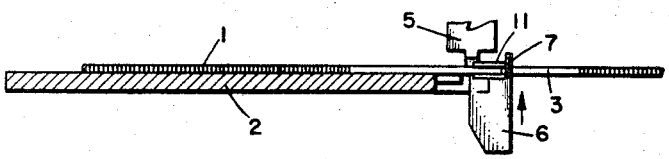
FIGURES 3a and 3b are side and top views respectively illustrating the slider in alignment and the spreading of the tape in front of the slider by a plunger.
Figure 3B:
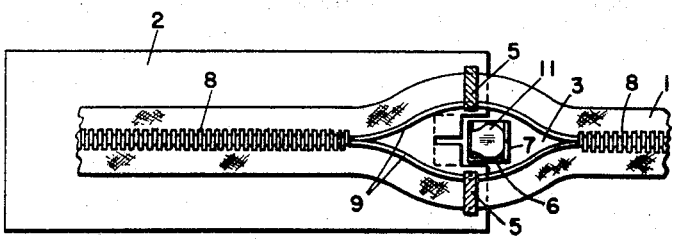
Figure 4:
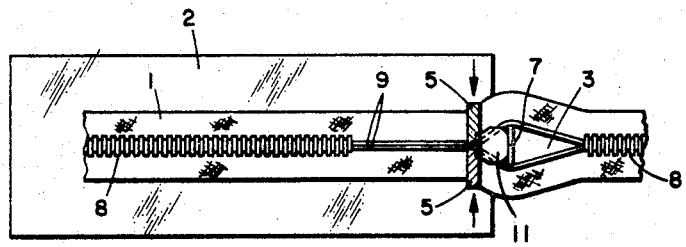
FIGURE 4 is a top view showing the grippers forcing the beads into the channels of the sliders.

FIGURE 4 illustrates the fourth phase of the cycle wherein the grippers 5 force the tape closed thereby engaging the beads 9 with the channels of the slider 11. The plunger and the nest remain in the position shown in FIGURE 3a. After engagement of the bead, the grippers 5 ascend, leaving the beads 9 in the channel 11, and the electrical clutch is activated for a short cycle, drawing the tape forward.

Figure 5:
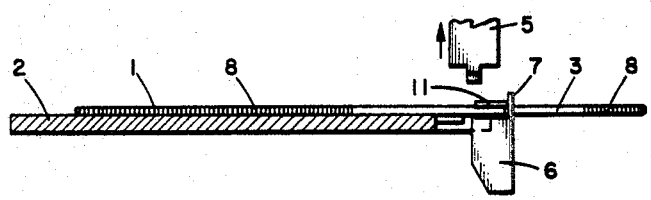
FIGURE 5 is a side view showing the grippers above and out of contact with the tape.

FIGURE 5 shows the relative position of the elements immediately after the grippers 5 disengage the tape 1. During the short forward movement of the tape 1, the elements 8 engage the slider 1. The plunger 7 now serves to restrain the slider, preventing its advance with the tape.

Figure 6:
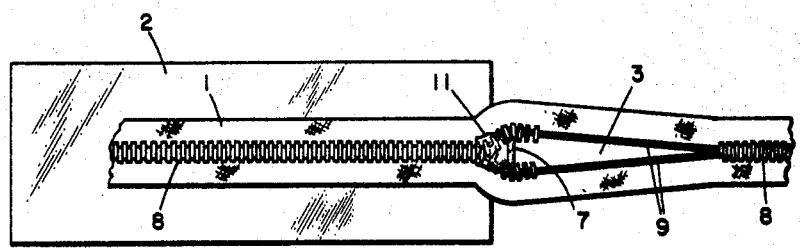
FIGURE 6 is a top view showing the position of the tape and slider after the tape has been advanced a short distance.
Figure 7:
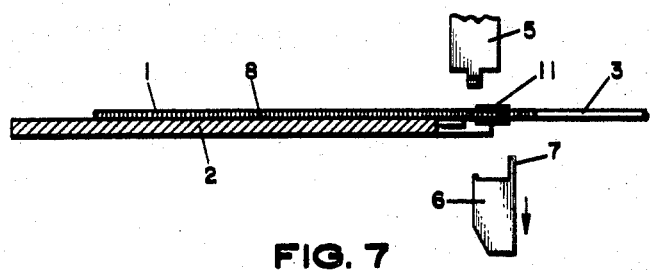
FIGURE 7 illustrates the descent of the nest and plunger at the end of the mechanical cycle.

FIGURE 6 shows the relation of the slider and the elements after the tape is advanced. Once the elements 8 engage the slider 11, the plunger and nest assembly descend and the electrical clutch is again engaged to transport the tape across the support 2. Another cycle is commenced upon the activation of the feeler 4 as described previously.

Figure 8:
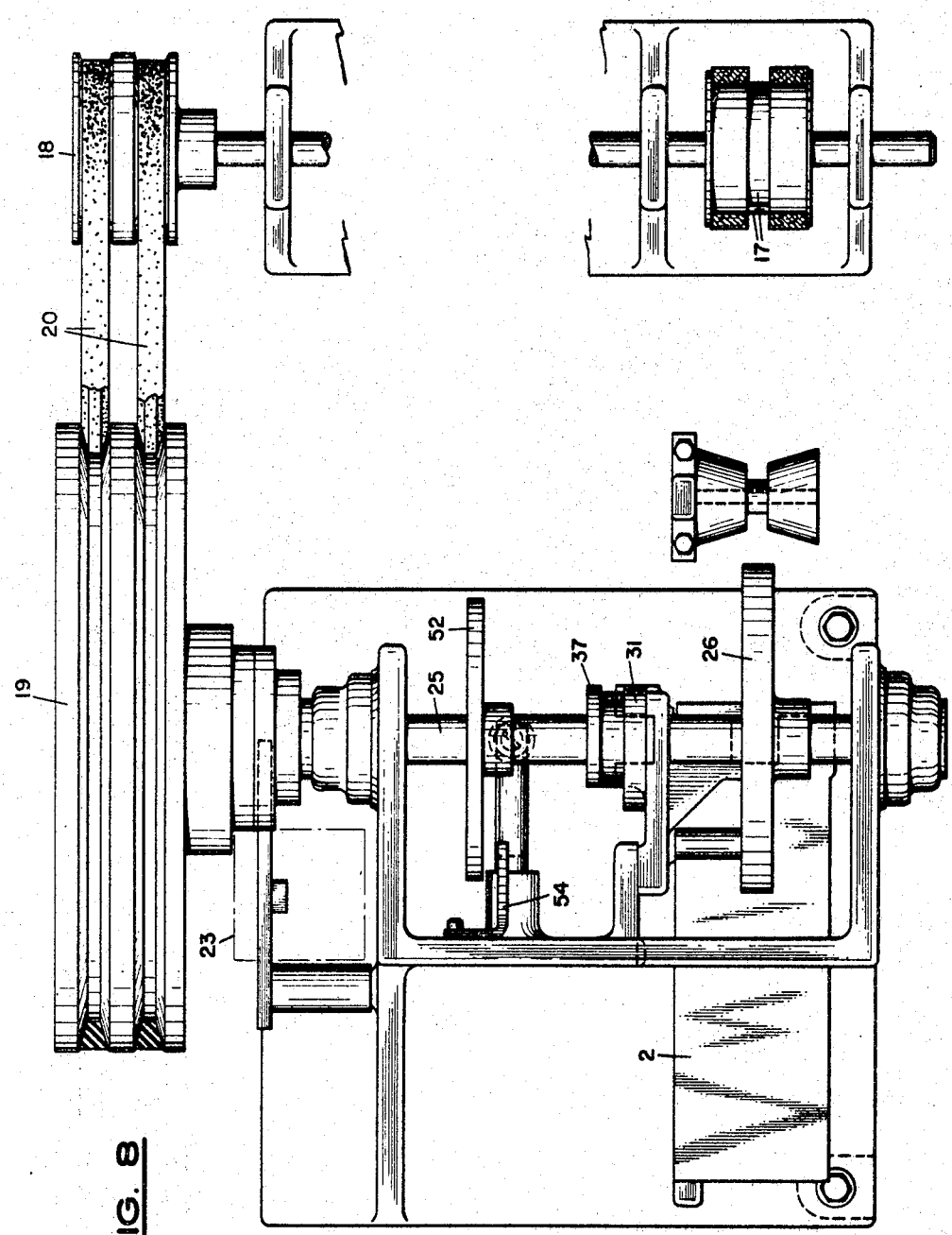
FIGURE 8 is a top plan view of the machine in accordance with the instant invention.
Figure 9:
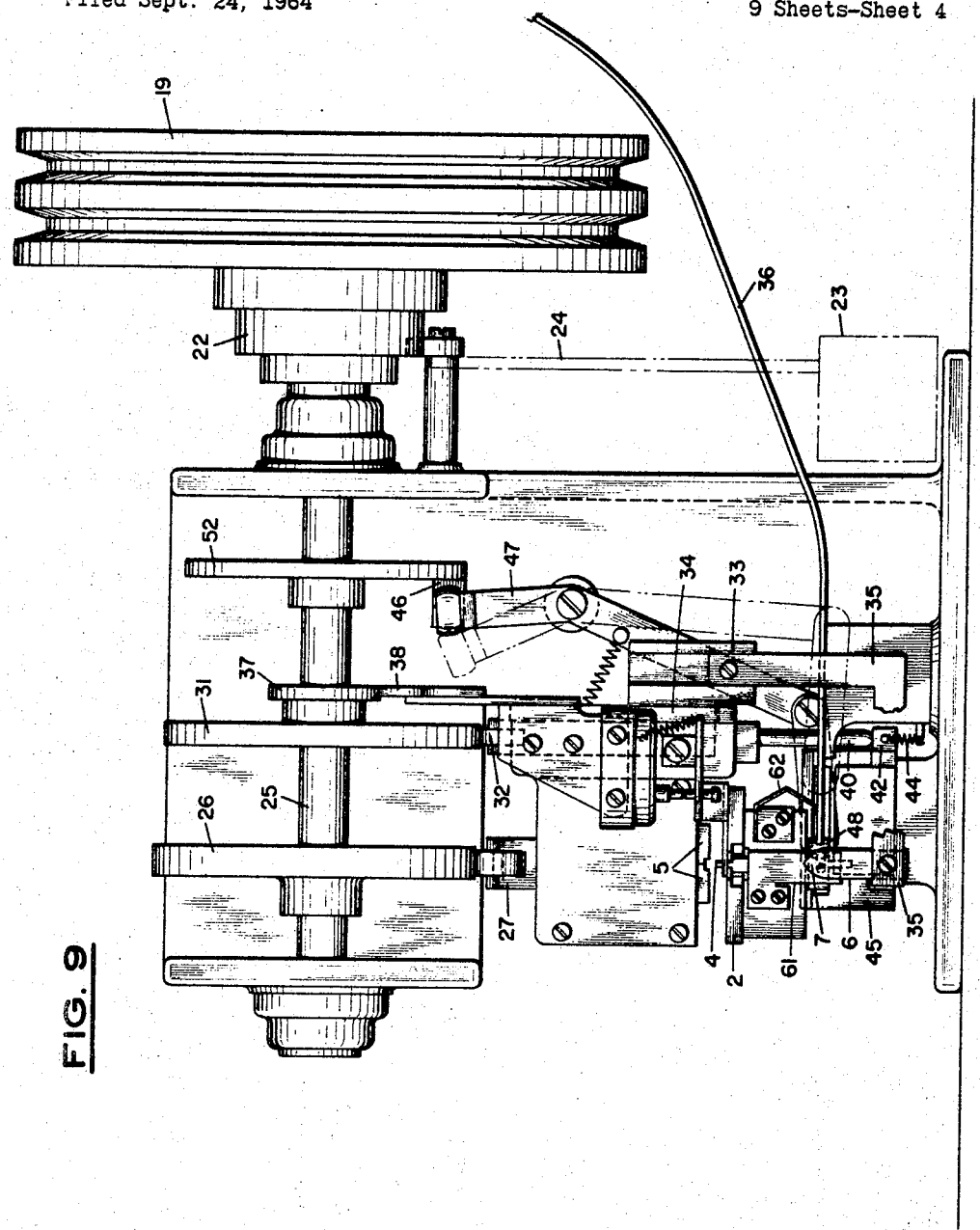
FIGURE 9 is a front elevation of the machine shown in FIGURE 8.
Figure 10:
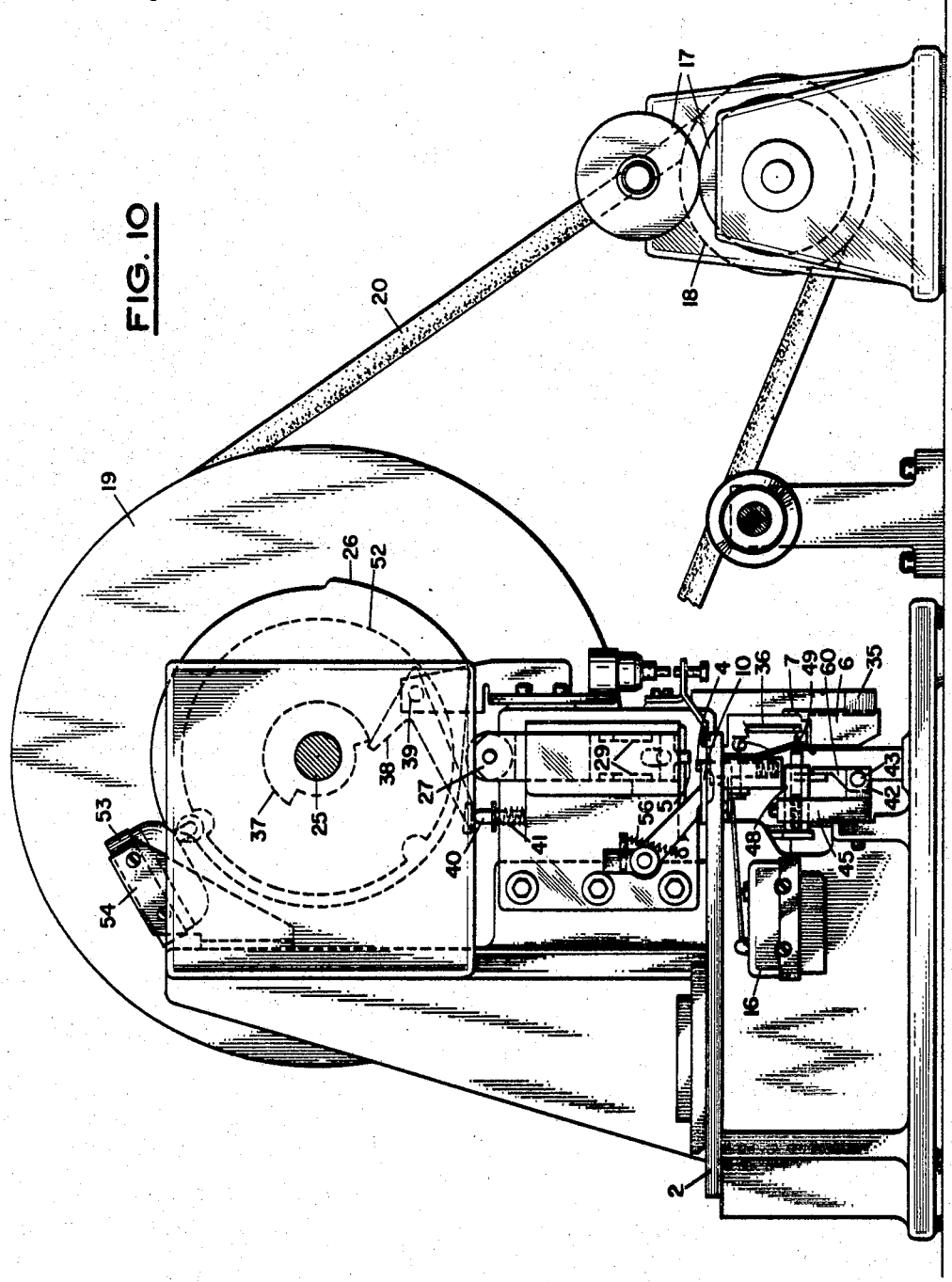
FIGURE 10 is a side view of the machine shown in FIGURE 8.
Figure 11:
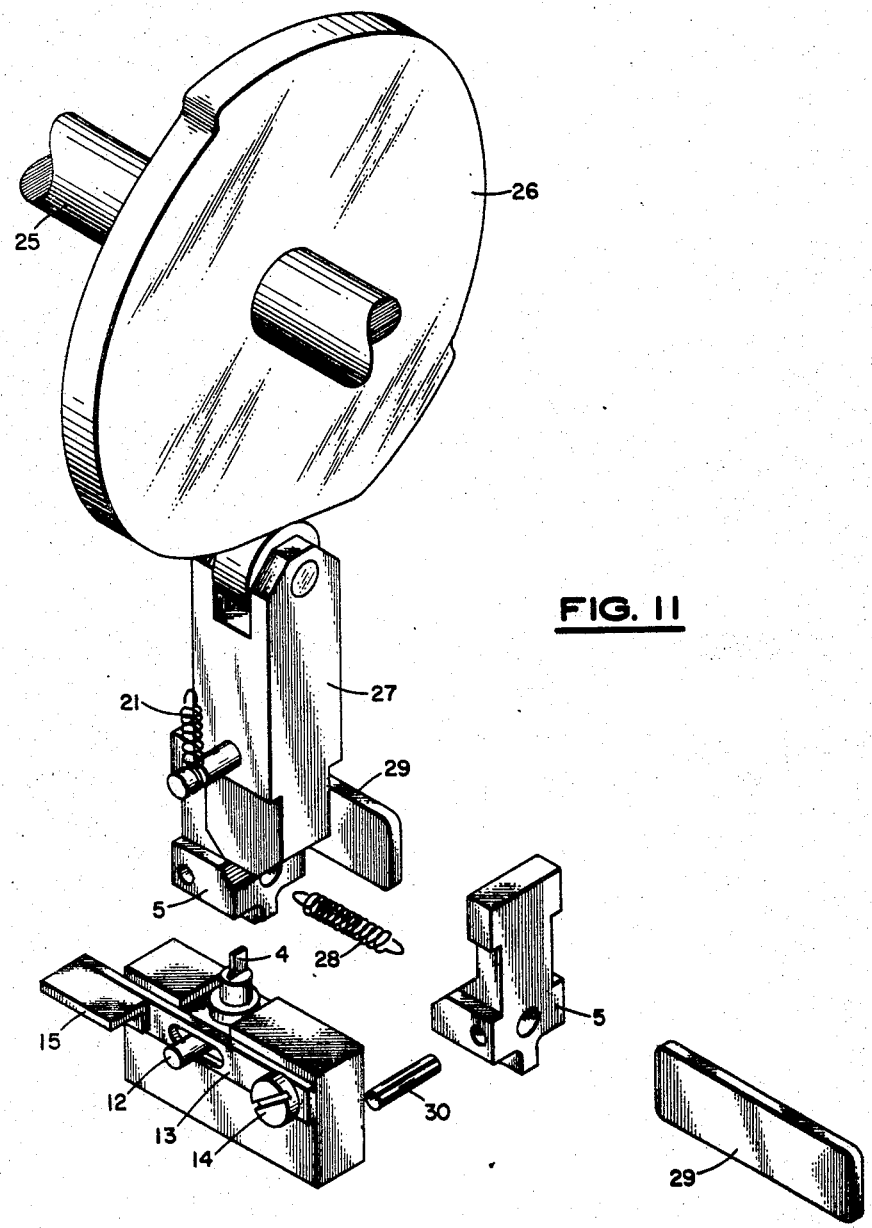
FIGURE 11 is a fractional isometric view of the feeler and gripper mechanism.

The operation and apparatus, which are a preferred embodiment of this invention, are illustrated in FIGURES 8, 9 and 10 and the subsequent isometric drawings. Basically, the apparatus consists of a support table 2 over which the slide fastener tape travels. The tape is drawn across the table by means of puller rollers 17. A series of cams 26, 31, 37, 46 and 52 is supported on a common shaft 25. One revolution of the shaft supplies one mechanical cycle. The sliders are fed to the apparatus by track 36. This track is continuously supplied with appropriately aligned sliders by a conventional vibrating hopper (not shown).

The tape 1 is drawn across support table 2 by means of puller rollers 17. Idler rollers and tension rollers (not shown) as is conventional, may be interposed between the main body of the apparatus and these rollers. Preferably the pull rollers 17 are connected by an electrical clutch to an electrical motor which drives the system. These units also are conventional and not illustrated. When the gap space of the tape passes over the finger 4, the finger rises into the gap space. Feeler rod 12 connected to the finger 4 in turn lifts lever bar 13. The lever bar 13 pivots in pivot screw 14 and the amplified motion communicated to depressor 15. This opens switch 16, which in turn disengages the electrical clutch (not shown) when, after a brief moment, the tape stops with the gap space in the appropriate position. Simultaneously, the mechanical cycle commences. Power is transmitted from pulley 18 to fly-wheel 19 via the drivebelt 20. Gripper cam 26 initially positions gripper cam follower 27 downwardly towards the tape 1. The grippers 5 engage the tape and, as the cam 26 continues to revolve, the wedge-shaped lower portion of the cam follower 27 causes the grippers and the tape to be spread apart. The gripper guide plates 29 and the guide-pin 30 maintain the grippers 5 in proper alignment.

Figure 12:
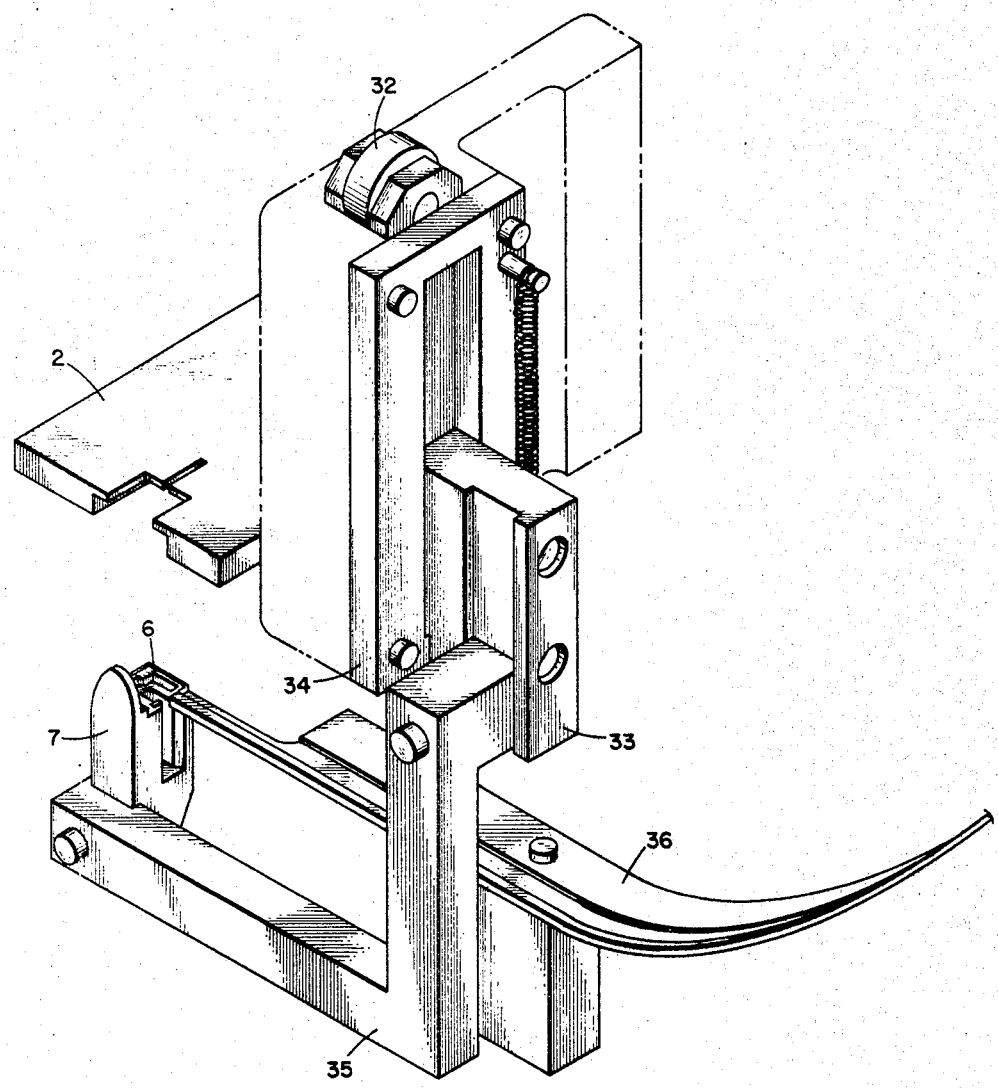
FIGURE 12 is a fractional isometric view of the plunger and nest mechanism.

At this time, as best shown in FIGURE 12, the slider is brought into position. The nest cam 31 allows the cam follower 32 to rise. Extension 33 rises therewith and is guided by guide-slot 34. This guide-slot in turn raises the slider bar 35 and the nest 6 and plunger 7. Of course, at this time a slider is resting in the nest 6, having been placed therein from the track 36 by a means which will be described subsequently. As the plunger 7 rises, it spreads the beads apart, thereby permitting the slider to be positioned between the grippers 5 and the plunger 7 in horizontal alignment with the tape resting on support table 2. The configuration of the nest cam 31 is such that the nest 6 and the plunger 7 stay in this uppermost position for about half of the mechanical cycle. When the slider is in the appropriate alignment, the rotation of the gripper cam causes the cam follower 27 to rise. This upward action is facilitated by the tension spring 21. As the wedged lower portion of the cam follower 27 rises, the tension spring 28 draws the grippers together. This action forces the bead into the channels of the slider. Shortly thereafter the grippers rise, releasing the tape. As the slider is brought into position by the nest 6, the microswitch 56 is closed and the electrical clutch preferably engaged, thereby drawing forward the tape so that the elements engage the slider. During this short forward motion of the tape, the plunger 7 and the nest 6 remain in position. The short cycle is begun when the microswitch 53, supported by bracket 54, strikes the first indentation in cam 52. It is terminated when this microswitch is again actuated by the second indentation. The plunger 7 serves to prevent the slider from moving forward with the tape and also maintains the tape in a spread position in front of the slider, thereby facilitating the opening of the slide fastener as the tape advances.

As the tape stops, the mechanical cycle continuing, the nest 6 and the plunger 7 are forced downwardly by the action of the cam 31 and the associated apparatus. At this point the cycle again resumes.

Turning now to FIGURE 13, the slide feeding mechanism is shown. The cam 37 and the associated equipment provide the forward and backward movement to the finger 49. The side-to-side movement is provided by the cam 46 and its associated equipment. In detail, the rotating cam 37 drives the cam follower 38 downwardly. The cam follower pivots on pivot 39 thereby depressing rod 30 against the action of compressor spring 41. The rod 40 drives lever 42 clockwise about pivot 43. This pivoting action similarly rotates guide means 45, slide 48, and finger 49 clockwise, or more specifically, rearwardly. The cam 46 actuates pivot bar 47 about pivot 55. This action serves to draw slider 48 reciprocally in the slot in guide means 45. This action, of course, also provides reciprocal motion in the finger 49. The spring 51 is provided and the finger 49 held in place in the hole in slide 48 by means of the pin 50. Pin 50 follows the motion of guide block 60, swings back and forth.

FIGURES 14a, b and c illustrate the pressure pad. This pad is shown on FIGURE 10 and is held against the tape by means of tension spring 56. The plate 57 presses down over the tape and holds it securely on support table 2. Groove 58 is provided which permits the bead and elements to pass therethrough and guide the tape in the proper position. So that the pressure pad may be positioned as close as possible to the gripper 5, a slot 59 is provided. The feeler 4, when the gap space is in the appropriate position, may rise up through the slot 59. This plate is of particular importance since it not only serves to maintain the tape in proper alignment on the support table 2, but also serves to hold the elements together as they are fed into the slider as the grippers are released.

FIGURE 15 is a diagrammatic view showing the unique slider feed means of the invention. FIGURE 15a illustrates the finger 49 as it engages the slider body through the rear aperture.

Figure 15B:
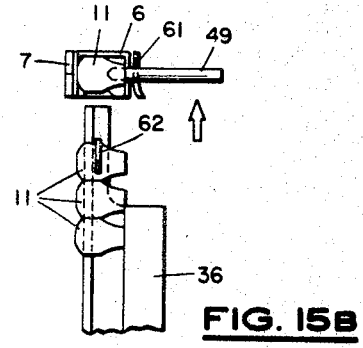
Figure 15C:
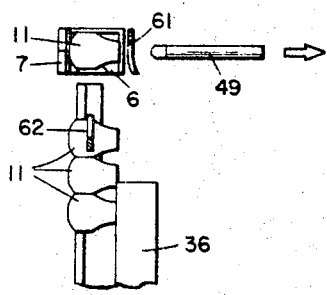
Figure 15D:
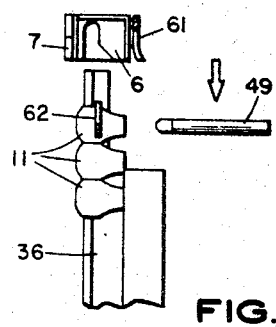

As described previously the finger is moved to the side carrying the slider 11 with it along track 36 into the nest 6. The slider is held securely on the narrow portion of the track by guide spring 62. (See FIGURE 9.) This position is illustrated in FIGURE 15b. The finger 49 then moves rearwardly and disengages the slider. The release spring 60 (see FIGURE 10) prevents the slider from moving forward with the finger, so that it remains in the nest 6. The slider may now be moved into tape engaging position. The finger 49 moves to the side, now in the opposite direction, and is positioned to engage the next slider. This slider is brought into position by means of gravity and the weight of the adjacent sliders. Finally the finger 49 moves forward again to engage another slider, thus completing the cycle.

The electrical system associated with the machine will be obvious to those skilled in the art. It may be briefly described as follows:

Initially, the motor is turned on and power applied to the electrical clutch through a rectifier. The puller advances the tab until the feeler goes into the gap and operates the feeler microswitch. This disengages the electrical clutch and engages the mechanical clutch to commence the mechanical cycle. The slider rises into position and the feeler is depressed to restore the normally closed circuit. The cam microswitch is operated for an instant by the two depressions or indentations in the cam. This advances the tab about one inch through the slider. The slider nest retreats and the cam microswitch is operated at the end of the mechanical cycle to start the puller again.

It will be apparent to those skilled in the art that many modifications may be made in the particular preferred embodiment illustrated, without departing from the spirit of the invention.

I claim:

1. A method of applying sliders to a slide fastener chain, said chain being composed of a pair of parallel tapes having beads and elements along their inner edge and an element-free gap space and said slider having oppositely disposed channels adapted to receive said beads, which comprises: positioning a gap space in said slide fastener chain at an assembly station; spreading said tapes apart at a first point towards the rear of said gap space; spreading tapes apart at a second point towards the front of said gap space and inserting a slider in alignment with said slide fastener chain between said points; forcing said tapes together at said first point to engage the beads thereof with the channels of said slider; and advancing said tape, while restraining said slider and continuing to spread said tapes at said second point to engage the elements on said tapes with said slider channels.

2. The method of claim 1 wherein said tapes are spread apart and forced together at said first point by a gripper.

3. A method for applying sliders to slide fastener chains, said chain being composed of a pair of parallel tapes having beads and elements along their inner edge and an element-free gap space and said slider having oppositely disposed channels adapted to receive said beads, which comprises: positioning an element-free gap space of said slide fastener chain at an assembly station; gripping the tapes bounding said gap space and spreading said tapes at a first point; inserting a spreader at a second point forward of said first point, so as to further spread said gap; aligning a slider between said first and said second points at said assembly station; forcing said beads into the channels of said slider with said grippers at said first point; advancing said tape with said slider; stopping said tape; removing said spreader from said second point; and again advancing said tape.

4. A method for transferring sliders, one at a time, from a track to a nest assembly which comprises: moving a finger forwardly so as to engage an aperture in the body portion of the lead slider on said track; moving said finger to one side so as to convey said slider down said track to said nest; moving said finger rearwardly so as to disengage said slider; moving said finger to the other side and cyclically repeating said operation.

5. A machine for applying sliders to slide fastener chains which comprises: means for transporting and guiding a slide fastener chain containing a pair of tapes with beaded inner edges and alternate element-containing and element-free intervals along a support table; means for locating an element-free interval at an assembly station; means for spreading said tapes at a first point at the rear of said assembly station; means for spreading said tapes at a second point at the front of said assembly station; means for inserting a slider in said element-free interval between said first and second points; means for forcing said tapes together at said first point; means for advancing said chain, while continuing to spread said tapes at said second point and restraining said slider, so as to engage said element-containing interval with said slider, and means for advancing said chain.

6. A machine for applying sliders to a slide fastener chain, which comprises: an assembly station having a support table passing therethrough; means for drawing a slide fastener chain across said support table through said assembly station; means for positioning an element-free interval at said assembly station; gripper means for gripping and spreading said tapes against said support table at a first point at the rear of said assembly station; plunger means for separating said tapes at the front of said assembly station; nest means adapted to bring a slider between said first and second points in alignment with said tapes; means for closing said gripper means so as to engage the beads on said tape in the channels of said slider; means for transporting said tape forwardly while said plunger means at said second point restrains said slider and spreads said tapes; means for disengaging said plunger means, and means for moving said engaged slider from said assembly station along with said chain.

7. The machine of claim 6 wherein said plunger is integrally united to said nest means.

8. A mechanism for transporting sliders into a nest from a track which comprises; an elongated finger for a leading edge adapted to being inserted into the rear aperture of a slider; means for moving said finger side to side and back and forth so as to define a rectangular path, said side to side movement being parallel to said track and said forward and back movement being perpendicular to said track.

9. The mechanism of claim 8 wherein said side to side movement is rectilinear and said back and forth movement is curvilinear.

References Cited by the Examiner
UNITED STATES PATENTS

| | | | |
|---|---|---|---|
| 2,949,666 | 8/1960 | Rogers et al. | 29—211 |
| 3,078,558 | 2/1963 | Longwell | 29—408 |
| 3,127,670 | 4/1964 | Bruning | 29—408 X |

WHITMORE A. WILTZ, *Primary Examiner.*